United States Patent [19]
Sono

[11] Patent Number: 5,665,418
[45] Date of Patent: Sep. 9, 1997

[54] FIBROUS KONJAK AND METHOD OF MANUFACTURING THE SAME

[75] Inventor: Masamitsu Sono, Yokohama, Japan

[73] Assignee: Yugen Kaisha Sono Kohsakusho, Japan

[21] Appl. No.: 509,350

[22] Filed: Jul. 31, 1995

[30] Foreign Application Priority Data

Jul. 29, 1994 [JP] Japan .................. 6-196316

[51] Int. Cl.$^6$ ........................ A23L 1/05
[52] U.S. Cl. ............ 426/640; 426/550; 426/573; 426/615
[58] Field of Search .............. 426/573, 615, 426/640, 550

[56] References Cited

U.S. PATENT DOCUMENTS

| | | | |
|---|---|---|---|
| 3,057,738 | 10/1962 | Forkner | 426/615 |
| 5,009,915 | 4/1991 | Ogawa | 426/615 |

FOREIGN PATENT DOCUMENTS

| | | | |
|---|---|---|---|
| 0386359 | 9/1990 | European Pat. Off. | A23L 1/0528 |
| 0592679 | 4/1994 | European Pat. Off. | A23L 1/31 |
| 0050863 | 3/1982 | Japan | 426/615 |
| 0227267 | 12/1984 | Japan | 426/615 |
| 0019459 | 1/1985 | Japan | 426/615 |
| 0065299 | 12/1988 | Japan | 426/615 |
| 1160465 | 6/1989 | Japan | 426/615 |

*Primary Examiner*—Helen Pratt
*Attorney, Agent, or Firm*—Ostrolenk, Faber, Gerb & Soffen LLP

[57] ABSTRACT

A fibrous and granular konjak prepared from solidified konjak that can be suitably used as a material of processed foods or as a dietary food by itself is provided. If used for processed foods, it can give rise to any intended flavor and taste. A fibrous and granular konjak product is prepared by crushing a kneaded and solidified mixture of konjak roots and lime. It consists of granular and fibrous pieces that are about less than 6 mm long and contain 5 to 10% moisture.

4 Claims, 1 Drawing Sheet

FIBROUS KONJAK AND METHOD OF MANUFACTURING THE SAME

BACKGROUND OF THE INVENTION

1. Field of the Invention

This invention relates to a fibrous konjak (a preparation made from the root of the konjak plant or Amorphophallus, a variety of taro or Colocasia antiquorum) that can be suitably used as a material of processed or a dietary food by itself. It also relates to a method of manufacturing such a fibrous konjak.

2. Background Art

Konjak is a preparation made from the root of the konjak plant or Amorphophallus and has been known, particularly in Japan, as a hardly digestible low caloric food that contains as two major ingredients other than water, glucomannan and calcium. It is produced by a process of mixing and kneading with lime (calcium hydroxide). Processed konjak is attracting attention as a healthy foodstuff because of the fact that glucomannan is a kind of dietary fiber and it is rich in calcium.

However, while the traditional method of cutting a block of konjak prepared from a kneaded and solidified mixture of konjak roots and lime into dices or appropriately sized pieces and cooking them according to a selected recipe may be good for preparing a food that can give rise to a unique and pleasant feeling in the mouth, as cherished by many Japanese people, it is not an appropriate way to effectively utilize the glucomannan as dietary fiber and calcium. Thus, efforts have been paid for processing konjak into forms that facilitate the use of konjak for processed and healthy foods.

Japanese Patent Publication No. 2-231045 discloses uniformly sized konjak chips prepared by pulverizing a block of kneaded and solidified mixture of powdered konjak roots and lime by means of a grindstone, boiling the pulverized konjak chips, washing and dehydrating the konjak chips. Since such chips are boiled and washed before packaging and therefore contains water to a large extent, they can easily become sour if kept at room temperature and need to be stored in the refrigerator. Additionally, the moisture contained in the chipped konjak can affect the final product in an unexpected way if it used with other materials and therefore it cannot be feasibly used for healthy foods. To the contrary, if the moisture content of the chipped konjak is lower than a specific level, it can become hard and poorly capable of absorbing water so as to make it unsuitable as a material of processed foods.

SUMMARY OF THE INVENTION

In view of the above identified problems, it is therefore an object of the present invention to provide fibrous konjak that is free from the smell and the touch peculiar to konjak prepared in a conventionally manner and which therefore can be used as a material of processed food or as a dietary food by itself. Fibrous konjak according to the present invention does not adversely affect the flavor and the touch of the processed foodstuffs used with it, while it can be handled with ease and absorbs moisture to a considerably extent. The present invention also relates to a method of manufacturing such fibrous konjak.

According to an aspect of the present invention, the above object is achieved by providing a fibrous konjak comprising granules formed by crushing under pressure a kneaded and solidified preparation of konjak roots and lime prepared by any conventional method and dehydrating/drying the crushed konjak, said fibrous konjak containing 5 to 10% moisture, and said fibrous konjak having a length of 6 mm or less.

According to another aspect of the present invention, there is provided a method of manufacturing a fibrous konjak containing 5 to 10% moisture and having a length of 6 mm or less comprising the steps of crushing under pressure a kneaded and solidified preparation of konjak roots and lime in the form of flat pieces to turn it into a granular state and drying it to obtain a fibrous konjak product containing 5 to 10% moisture and having a length of 6 mm or less.

Konjak roots to be used for the purpose of the present invention may or may not be milled. For the purpose of the present invention, any conventional process for manufacturing a konjak may be used without modifications down to the solidifying step. Lime is added to the konjak root at a rate between 3 and 10 grams per 100 grams of konjak root and the calcium content of the final product depends on the rate at which lime is added to konjak root. Coloring additives, if used, are preferably added while milled konjak roots and lime are being mixed and kneaded. If appropriate, green and dried laver, sesame seed, flour, starch and/or other foodstuffs may be added.

While any appropriate means may be used for crushing by pressure flat pieces of the solidified preparation of konjak roots and lime so long as such means can crush the pieces into a granular intermediary preparation and at the same time effectively remove the moisture content therefrom, the use of a press machine is the preference for the purpose of the present invention. The press machine is preferably provided with a pair of press plates having rugged opposite surfaces and a device for generating and applying vibration and pressure to the plates. Flat pieces of the solidified preparation of konjak roots and lime are fed between the rugged surfaces of the press plates having 0.3 to 2.0 mm deep grooves so that they may be crushed to form a granular product under pressure and vibration.

According to this crushing step, the preparation of konjak roots and lime are crushed into granular shapes. However they are not pulverized or powdered in comparison with the case where a grindstone is employed, and accordingly, the resulted preparation is formed into granular shapes having certain fibrous formations unbroken.

The heating step for the crushed preparation of konjak is preferably conducted at temperatures between 80° and 100° C., using steam or boiling water, for 20 to 30 minutes. As a result, any smell of konjak is removed from the crushed preparation of konjak roots and lime, which is then immersed into water in a water tank or made to pass under water shower for washing and removing impurities before it is resolidified. The washed intermediary preparation is then dehydrated by a centrifugal separator to remove moisture from the surface or the voids thereof for 1 to 3 minutes, although the moisture trapped in the tissues of konjak in the preparation is not removed by the centrifugal separator and the preparation remains wet after the step of removing moisture.

After the moisture removing step, the crushed granular intermediary product becomes fibrous. However, since such a fibrous state is not convenient for handling, it is cut to fine pieces that are 5 to 8 mm long, which are wet under this condition as they contain moisture within the tissues of konjak and tend to adhere to each other to become a mass. So, they are freeze-dried at temperature below −10° C. for 1 to 2 hours to expel moisture contained within the tissues. If they are cooled to below −20° C., the moisture contained within the tissues turns into relatively large blocks of ice, which are separated from the combined glucomannan and calcium so that the volume of the product will be considerably reduced when it is dried to remove the iced moisture from it.

The drying operation may be carried out either by blowing hot air or by heating and blowing air. It takes 1 to 2 hours when hot air blowing and the hot air is as hot as 150° C. If, on the other hand, wet fibrous konjak is dried by heating it to 200° to 300° C. and blowing air, the operation will be over in about 30 minutes. The moisture in the tissues of konjak is removed by this drying operation that follow the above described cooling operation to produce an amorphous, porous and granular product that can be divided into granules, in which combined glucomannan and calcium are found to be even more fibrous like intertwined waste thread, giving the product an appearance almost inconceivable from the original konjak roots. If the moisture content of the product is reduced to less than 5.0%, it will significantly lose the ability of absorbing moisture and make it poorly suitable for foods. If, on the other hand, the moisture content is greater than 10%, the product will be too wet. Most preferably, therefore, the product contains about 8.0% moisture.

A fibrous konjak according to the invention and comprising granular and porous pieces that have a length of 6 mm or less and contains 5 to 10% moisture does not have the smell and the touch peculiar to traditional konjak and is almost free from souring and therefore does not need to be stored in the refrigerator as in the case of a comparable wet product. Additionally, if mixed with other foodstuffs, it does not absorb moisture to return to ordinary konjak nor damage the flavor and taste of the processed food product containing it. Since a fibrous konjak according to the invention is rich in dietary fiber and calcium, it may be consumed by itself as a dietary food.

The prepared fibrous konjak can be used not only as a material of processed foods that exactly taste like hamburg steaks and sausages, for which known chipped konjak can also be used, but for almost all kinds of processed food including udon noodle, macaroni, spaghetti, kamaboko or boiled fish paste, gyoza or Chinese style fried dumplings stuffed with minced pork and shumai which is also a Chinese style food using minced pork. It can also be used as a dietary food by itself.

DETAILED DESCRIPTION OF THE PREFERRED EMBODIMENTS

EXAMPLE

Figure 1:
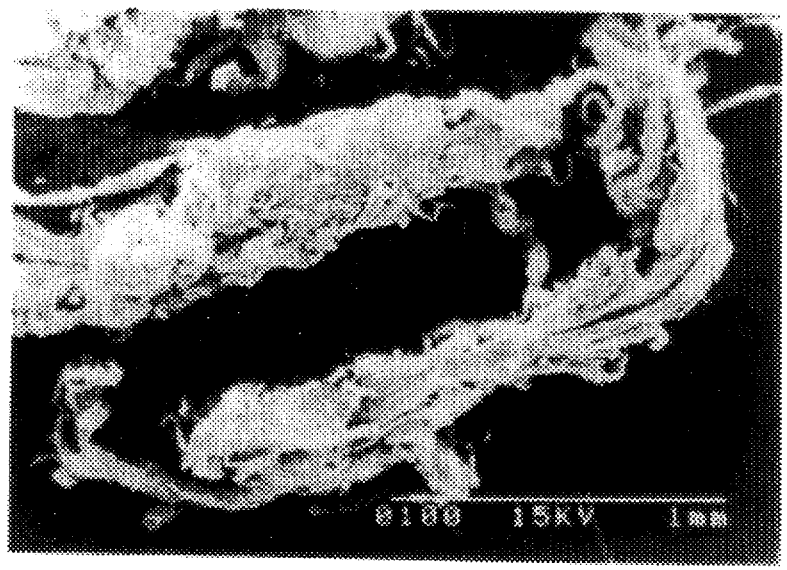
FIG. 1 is a photograph showing a granular fibrous konjak according to the present invention, where it is enlarged about 50 times by means of an electron microscope.

An aqueous solution containing a 70 grams of lime was added to a 1 kilograms of milled konjak roots while kneading the mixture by conventional means to form an intermediary preparation. The preparation was then cured in a shallow molding box which was bathed in hot water to form a sheet of konjak having an average thickness of 3 mm. Then, the sheet was fed between a pair of press plates having rugged opposite surfaces that carried 10 mm deep grooves for mutual engagement of the plates. The sheet of konjak was pressed hard between the plates and given two series of vibration. As a result, the sheet of konjak was crushed and squeezed to release the moisture contained therein.

Since the crushed intermediary preparation was soaked with the released moisture, the moisture was removed by dripping and then boiled in hot water at 90° C. for about 25 minutes. As a result, the lime remaining in the preparation and the impurities contained in the lime were drawn out of it and the crushed preparation was solidified again. After the boiling operation, it was put in a water tank and washed to remove any impurities adhering to the surface until the smell of konjak generated by the addition of lime was completely gone.

After the washing, the crushed preparation was dehydrated by a centrifugal separator for 3 minutes in order to remove the moisture contained therein by 50 to 60%. As the moisture content was partly removed, the preparation became rather fluffy but still took the form of a mass. So, it was cut to about 5 mm long small pieces by means of a rotary cutter.

The product was fibrous and granular but still wet. It was stored in a freezer at −20° C. for about an hour to freeze the moisture contained in the tissues of the product. The frozen granular product was then put in a hot air drier and dried at 150° C. for one and a half hours to reduce the moisture content to a level of about 8%.

The finished product taken out of the drier consisted of granular and porous pieces that were about 5 mm long, each comprising entangled short fibers shown in the photograph of FIG. 1. Many of the pieces were nappy. The fibrous granules or fibrous konjak was analyzed for its contents and proved to be as follows.

dietary fiber 89.7 gr/100 gr (by A. O. A. C. method)
calcium 760 mgr/100 gr (by atomic absorption spectrometry)
water 8.3 gr/100 gr (by atmospheric heat drying).

The thus prepared fibrous konjak according to the invention did not have the smell and the touch peculiar to traditional konjak. In addition, there was no souring occurring after storing it at room temperature in comparison with a conventional chipped konjak.

When it was mixed with other foodstuffs, it did not return to ordinary konjak and did not damage the flavor and taste of the processed food product containing it.

What is claimed is:

1. A method of manufacturing a fibrous konjak containing 5 to 10% moisture, characterized in that it comprises the steps of kneading a mixture of konjak roots and lime to produce a preparation in the form of flat pieces, solidifying the preparation, pressure-crushing the preparation, heating the crushed preparation at a temperature between 80° and 100° C. using steam or boiling water for 20 to 30 minutes to remove any smell of konjak, washing the crushed preparation, removing moisture from the crushed preparation to turn it into a granular state and drying it into a fibrous konjak product.

2. A method of manufacturing a fibrous konjak according to claim 1, wherein the drying step is carried out by freeze-drying at a temperature below −10° C.

3. A method of manufacturing a fibrous konjak according to claim 1, wherein the pressure-crushing step is carried out in a press machine provided with a pair of press plates having rugged opposite surfaces and 0.3 to 2.0 mm deep grooves and a device for generating and applying vibration and pressure to the plates so as to pressure-crush flat pieces of the fed solidified preparation of konjak roots and lime between the rugged surfaces of the press plates into a granular product under pressure and vibration.

4. A method of manufacturing a fibrous konjak according to claim 1 wherein the pressure-crushing step is carried out in a press machine provided with a pair of press plates having rugged opposite surfaces and 0.3 to 2.0 mm deep grooves and a device for generating and applying vibration and pressure to the plates so as to pressure-crush flat pieces of the fed solidified preparation of konjak roots and lime between the rugged surfaces of the press plates into a granular product under pressure and vibration.

* * * * *